Jan. 6, 1925.
W. J. MOORE
POT LIFTER
Filed Aug. 27, 1924
1,521,642
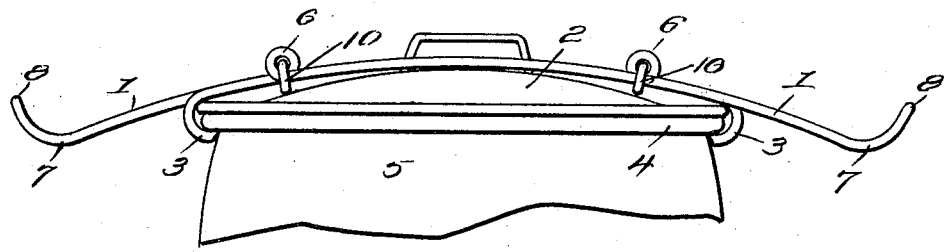
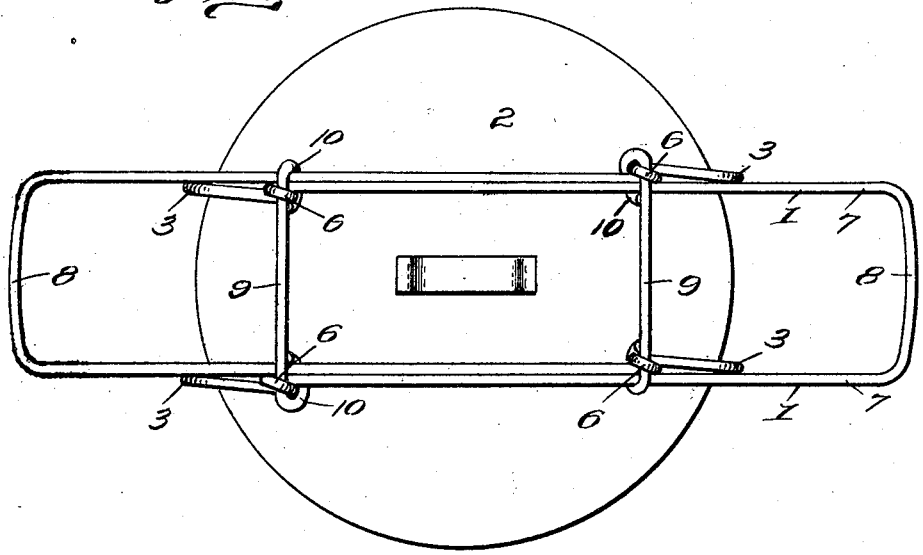
Inventor
W. J. Moore.

Patented Jan. 6, 1925.

1,521,642

UNITED STATES PATENT OFFICE.

WILLIAM J. MOORE, OF LANCASTER, MASSACHUSETTS.

POT LIFTER.

Application filed August 27, 1924. Serial No. 734,463.

*To all whom it may concern:*

Be it known that I, WILLIAM J. MOORE, a citizen of the United States, residing at Lancaster, in the county of Worcester and State of Massachusetts, have invented certain new and useful Improvements in a Pot Lifter, of which the following is a specification.

This invention relates to an improved pot lifter which has been especially, but not necessarily, designed for household use to enable the housewife or cook to safely handle pots containing boiling fluid.

In producing the invention it was my object to provide a novel device adjustable for engaging pots of different diameters and affording a firm grip upon the pots so that it may be safely lifted from the stove and carried to any desired point.

One feature is the slidably and adjustably connected pot gripping devices constructed for engaging the pot at diametrically opposite points, these devices being such as to extend cross wise of the lid to simultaneously hold the latter closed while the pot is being carried.

It is also a feature to construct the pot gripping device from lengths of wire and bending each length into U-shaped form to permit the bight portions to serve as handles and to permit the free ends to be bent into hooks for engaging the bead at the top of the pot.

Other features and advantages of the invention will become apparent from the following description and drawing.

In the accompanying drawing:—

Figure 1 is an elevational view of a pot lifter constructed in accordance with this invention and showing the manner of using the same.

Figure 2 is a top plan view of Figure 1.

As before intimated, the device comprises a pair of duplicate pot gripping devices, each of which is formed with a single length of wire, the wire being bent into a U. The arms 1 are bowed longitudinally to conform somewhat to the contour of the lid 2. At their free ends they are bent to form hooks 3 to take over the edge of the lid and engage beneath the bead 4 at the top of the pot 5. Adjacent these hooks, the arms are bent to provide eyes 6. They are also bent upwardly adjacent the bight portion as indicated at 7 to form a hand grip 8.

The arms of the two U-shaped members are arranged in telescoping relation and a pair of cross pieces or wires 9 are utilized for connecting them together in this relation. In the present instance, the cross pieces are extended through the opposed eyes 6 and the free ends thereof are bent around the slidably engaged and adjacent arms as at 10 to form retaining guides or eyes. With this arrangement it is obvious that the handles or hand grips may be moved toward and from each other while the bead engaging hooks are likewise moved. Thus these hooks can be arranged for engaging pots of varying diameters. It is to be noted that the handles are extended considerable distances beyond the hooks, thus positioning them on opposite sides of the pot, consequently, when they are gripped by the hand, the latter are disposed in a position to take them out of the path of any steam which may be escaping from the pot. Thus, the device is safe to use. Not only this, when the device is positioned as seen in Figure 1 and both the hand grips are gripped by the hands, when the pot is lifted, it is impossible for the lid to come off. A device of this kind will be found very desirable for lifting the pot from the stove and carrying it to a place to enable the undesirable liquid contents to be drained by tilting the pot in the sink or the like.

The foregoing and other advantages and features of the invention have doubtless been made apparent from the description and drawing, for this reason, I do not believe that it will be necessary to embody a more lengthy description.

Having thus described the invention, what I claim is:—

A pot lifter comprising a pair of U-shaped members, each of which is formed from a single length of wire bent to form a U, the free ends of the arms of each member being bent to provide hooks, the bight portions of the members being bent to provide handles, the arms being bent between their ends to provide opposed eyes, cross pieces extending through said eyes and having their ends bent around the adjacent arms to slidably and adjustably connect said members together.

In testimony whereof I affix my signature.

WILLIAM J. MOORE.